Dec. 28, 1926.
J. A. ANDERSON
1,611,982
ATTACHMENT FOR BEARINGS
Original Filed Sept. 9, 1920
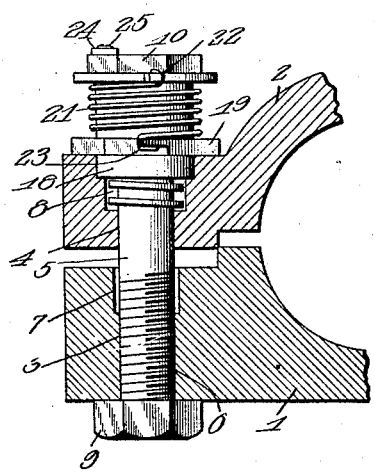
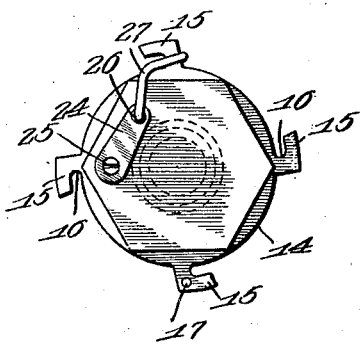
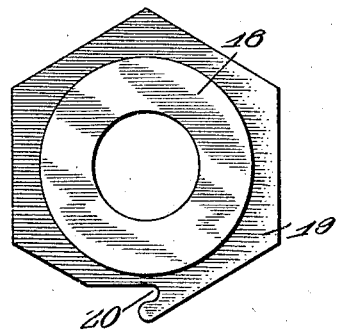
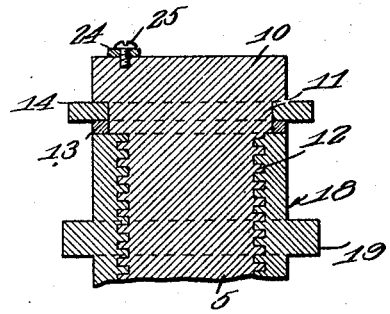
J.A. Anderson,
Inventor
By C.A. Snow & Co.
Attorneys Patented Dec. 28, 1926.

1,611,982

UNITED STATES PATENT OFFICE.

JOHN A. ANDERSON, OF GENESEO, ILLINOIS.

ATTACHMENT FOR BEARINGS.

Original application filed September 9, 1920, Serial No. 409,202. Divided and this application filed March 30, 1923. Serial No. 625,363.

This invention relates to improvements in nuts and bolts, and is a division of my copending application Ser. No. 409,202, patented May 15, 1923, No. 1,455,515. The object of the invention is to provide an improved attachment adapted to be applied to bearings, boxes, journals or the like for the purpose of taking up wear or end play on shafts, collars and the like.

Another object of the invention is to provide novel means whereby a nut or bolt may be rotated to take up wear in the part through which the bolt passes.

Another object is to provide novel means whereby a spring which imparts rotation to the bolt may be wound up and held under tension.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawing:—

Figure 1 represents a side elevation of the device constituting this invention shown assembled with the bearing, the parts of the bearing appearing in section.

Fig. 2 is a top plan view of the device.

Fig. 3 is a plan view of one of the nuts, and

Fig. 4 is a fragmentary longitudinal section with parts broken away.

In the embodiment illustrated two bearing members 1 and 2 are shown which are designed to be held together, said members having registering apertures 3 and 4 for the passage of a bolt 5. This bolt is threaded at one end as shown at 6 to receive a nut 9 which bears against part 1. The inner portion of the aperture 3 is preferably enlarged as shown at 7. The aperture 4 in the part 2 has a recess 8 for a purpose presently to be described.

The bolt 5 is provided at its upper end with a head 10 having a reduced neck 11 with threads 12 arranged inwardly of the neck 11. A washer 13 fits on the neck 11 preferably with a driving fit. A rotatable member 14 in the form of an annular plate is journaled on the neck 11 between the washer 13 and head 10, said member having radially extending arms 15, each of which is provided with a notch 16. One of these arms 15 is equipped with an aperture 17 for a purpose to be hereinafter described.

A tubular nut 18 has threaded engagement with the threads 12 of the bolt and is provided midway its ends on its outer face with a flange 19 having a notch 20 therein. The inner end of the nut 18 is designed to extend into the recess 8 of the part 2.

A coiled spring 21 is engaged around the nut 18 between the flange 19 and the rotatable member 14. This spring is equipped with hooks 22 and 23 designed to respectively engage in the aperture 17 of the rotatable member 14 and with the notch 20 of the flange 19 on the nut 18.

A plate 24 is pivotally connected to the head 10 of the bolt by a pivot element 25 and has an opening 26 at its free end to receive a hook 27. This hook may be in the form of a piece of wire and adapted to engage one of the arms 15 of the rotatable member 14 as is shown clearly in Fig. 2.

When the parts are arranged as shown in Fig. 1, the flange 19 of the tubular nut 18 engages the outer face of the part 2 while the nut 9 engages part 1. The rotatable member 14 is turned until spring 21 is under tension and which is held again reverse rotation by means of the parts 24 and 27 which may be termed a detent.

From the above description it will be obvious that if due to wear or other causes, looseness should exist at the point of engagement between the flange 19 and the part 2, the spring 21 will react to rotate the tubular nut 18 advancing it along the threads 12 of the bolt and securing a new hold on the member 2.

It is of course understood that in assembling the bolt in connection with the parts to be secured, the nut 18 is screwed onto the bolt close to the head 10 thereof and then the bolt with the nut so mounted is slipped down through the openings in the members 2 and 1 and the threads on the outer end are engaged with those in part 1 after passing therethrough and held against turning by the lock nut 9.

The threads 12 may be of any desired pitch, capable of obtaining best results since bearings vary in size and a small bearing with high pitch threads on the bolt would make a much tighter bearing than one with lower pitch threads.

It is of course understood that this bolt may be operated automatically by the operation of the spring 21 or it may be tightened up by hand if desired.

Various changes in the form, shape, proportion and other minor details of construction may be made without departing from the principle or sacrificing any of the advantages of the claimed invention.

I claim:—

1. In a device of the class described, coacting elements comprising a bolt and a nut having cooperating threads, a rotatable member, means for supporting said member on one of said coacting elements for rotation independently of the threads of the bolt, a torsion spring connecting the rotatable member and the nut, and means easily removable for holding said member releasably against rotation, said means being connected to the rotatable member and to one of said coacting elements.

2. In a device of the class described, a bolt having threads and provided with a head, a nut on the threads of the bolt, a rotatable member journaled on the bolt adjacent the head independently of the threads of the bolt, a torsion spring connected to the rotatable member and the nut, and a releasable connection between the rotatable member and the head of the bolt.

In testimony that I claim the foregoing as my own, I have hereto affixed my signature.

JOHN A. ANDERSON.